United States Patent
Niemann et al.

(10) Patent No.: US 10,665,092 B2
(45) Date of Patent: May 26, 2020

(54) METHOD FOR WIRELESS COMMUNICATION BETWEEN A VEHICLE AND AN EXTERNAL SERVICE FACILITY

(71) Applicant: HELLA GmbH & Co. KGaA, Lippstadt (DE)

(72) Inventors: Thomas Niemann, Delmenhorst (DE); Christian Jurgens, Stuttgart (DE); Patrick Fuchs, Leonberg (DE); Hauke Baumgartel, Delmenhorst (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 15/965,370

(22) Filed: Apr. 27, 2018

(65) Prior Publication Data

US 2018/0315302 A1 Nov. 1, 2018

(30) Foreign Application Priority Data

Apr. 27, 2017 (DE) .................. 10 2017 109 013

(51) Int. Cl.
*G08C 23/02* (2006.01)
*H04W 4/44* (2018.01)
*B60L 53/65* (2019.01)
*B60L 53/66* (2019.01)

(52) U.S. Cl.
CPC ............ *G08C 23/02* (2013.01); *B60L 53/65* (2019.02); *B60L 53/66* (2019.02); *H04W 4/44* (2018.02)

(58) Field of Classification Search
CPC ....... G08C 23/02; H04W 4/44; B60L 11/1818
See application file for complete search history.

(56) References Cited

U.S. PATENT DOCUMENTS

| | | | |
|---|---|---|---|
| 9,770,993 B2 | 9/2017 | Zhao et al. | |
| 2010/0080086 A1* | 4/2010 | Wright | H04B 11/00 367/191 |
| 2012/0229253 A1 | 9/2012 | Kolar | |
| 2014/0354229 A1 | 12/2014 | Zhao et al. | |
| 2015/0127228 A1* | 5/2015 | Jeong | B60R 16/037 701/49 |
| 2016/0097854 A1* | 4/2016 | Baumgartel | G01S 15/931 367/135 |
| 2018/0003808 A1* | 1/2018 | Niwa | G01S 15/93 |
| 2018/0222337 A1* | 8/2018 | Cook | B60L 11/1818 |

FOREIGN PATENT DOCUMENTS

| | | | |
|---|---|---|---|
| DE | 102013200475 A1 | 7/2014 | |
| DE | 102014107153 A1 | 12/2014 | |
| DE | 102016209192 A1 | 12/2016 | |

* cited by examiner

*Primary Examiner* — Nabil H Syed
(74) *Attorney, Agent, or Firm* — Muncy, Geissler, Olds & Lowe, P.C.

(57) ABSTRACT

In a method for wireless communication between a vehicle, particularly a motor vehicle, and an external service facility, wherein at least one communication signal is sent to the vehicle by the service facility, it is provided as essential for the purposes of the invention that the communication signal is a sound signal, and that the communication signal is captured by at least one structure-borne sound sensor installed in the vehicle.

8 Claims, 1 Drawing Sheet

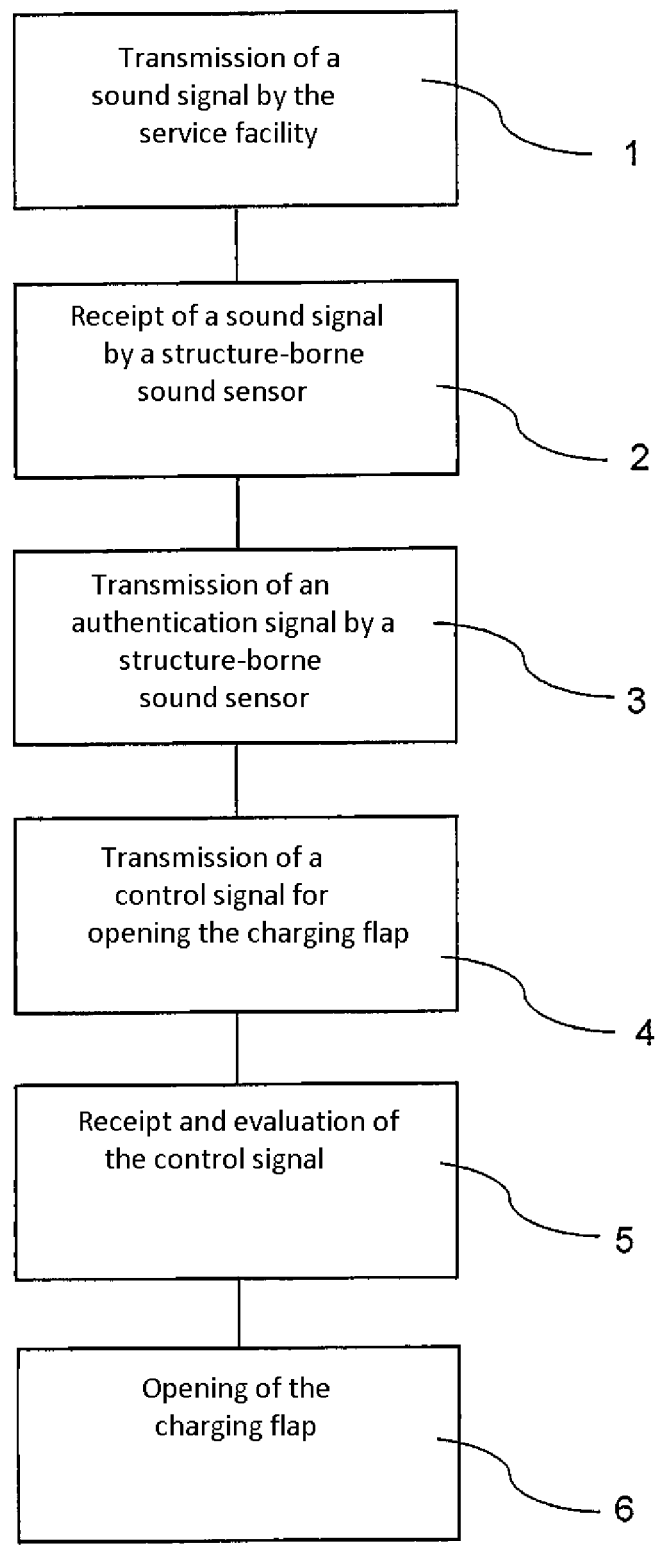

METHOD FOR WIRELESS COMMUNICATION BETWEEN A VEHICLE AND AN EXTERNAL SERVICE FACILITY

The invention relates to a method for wireless communication between a vehicle and an external service facility, and to a vehicle, particularly a motor vehicle with at least one structure-borne sound sensor, with at least one evaluation device for evaluating the signals captured by the structure-borne sound sensor.

As automation becomes more widespread, methods for wireless communication between service facilities and motor vehicles are also becoming more important. For electric vehicles, for example, service facilities can be provided for electrically charging the motor vehicle's accumulator batteries. Besides a charging connection for charging the batteries, a communication connection is also needed between the vehicle and the service facility. For example, information for monitoring the charging process, such as the capacity of the battery at hand, the electrical energy drawn and information for ending the charging process for example may be exchanged via the communication connection.

An electric vehicle charging station is known for example from DE 10 2016 209 192 A1. The electric vehicle charging station is designed for multiple users and comprises a mobile charging apparatus for multiple parking spaces, a controller which is connected to the charging apparatus for operating purposes, and a human-machine interface device in communication with the controller. In this context, the human-machine interface device contains a status which is selectable by the user, including a user identifier, a current battery status and an expected departure time. The controller may contain a wireless communication receiver.

The disadvantage of the known related art is that in order to create a wireless communication connection in the vehicle a communication device designed specifically for that purpose is required.

The object underlying the invention is to suggest a method for producing a wireless communication device between a vehicle and a service facility for which no communication devices provided especially for that purpose are needed.

This object is solved with a method having the features of Patent claim 1 and with a vehicle having the features of Patent claim 7. Further developments and advantageous variants are described in the respective subclaims.

In a method for wireless communication between a vehicle, particularly a motor vehicle, and an external service facility, wherein at least one communication signal is sent to the vehicle by the service facility, it is provided as essential for the purposes of the invention that the communication signal is a sound signal, and that the communication signal is captured by at least one structure-borne sound sensor installed in the vehicle. Structure-borne sound sensors are installed in many vehicles for various purposes. For example, contacts between the outer shell of the vehicle and objects such as occur as a result of parking dents or other accidents can be detected via structure-borne sound sensors. Structure-borne sound sensors may be created using piezo-electrically active elements, particularly piezoelectrically active foils, for example. Most structure-borne sound sensors are mounted inside the vehicle in such manner that the structure-borne sound is conducted to the vehicle outer shell. A service facility may be for example a charging station for electrical charging of a vehicle, for example an electric vehicle. Besides providing a charging connection, a communication device between the vehicle and the service facility is necessary so that the current battery charging level of the vehicle, the capacity of the secondary battery or similar parameters relating to the charging operation may be queried, for example. In this context, the communication signal that is sent to the vehicle by the service facility is a sound signal. With a sound signal, structure-borne sound sensors installed in the vehicle can be excited so that the transmitted communication signal can be captured. In this way, information can be exchanged between the service facility and the vehicle via sound signals. The information may be contained in the sound signals in the form of modulations, for example. When the structure-borne sound signals are used as receivers for the communication signals, no additional receiving devices provided especially for the purpose are needed in the vehicle.

In a further development of the method, at least one communication signal is sent to the service facility via at least one structure-borne sound sensor. Besides their function as signal receivers, structure-borne sound sensors may also be used as signal transmitters. For this purpose, for example, a voltage signal may be applied to the structure-borne sound sensor, particularly a structure-borne sound sensor embodied as a piezoelectric element, so that the structure-borne sound sensor is caused to oscillate by the piezoelectric effect, and so transmits a signal, particularly a sound signal. In this way, the structure-borne sound sensors already installed in the vehicle may function both as receiving devices and as transmitting devices for communicating with an external service facility.

In a further development of the invention, at least one communication signal is an ultrasound signal. Ultrasound signals which are used for communication may be transmitted in alternating manner by the structure-borne sound sensors on the vehicle and the service facility as communication signals between the service facility and the vehicle. Ultrasound signals are not audible for individuals, such as individuals in the vicinity, with the result that no noise pollution occurs.

In a further development of the method, a communication signal is sent to the service facility by at least one structure-borne sound sensor as an authentication signal for the purpose of unique authentication of the vehicle. The authentication signal may be for example a unique code defined specifically for the vehicle, which code has been stored in a control device in the vehicle, for example. By transmitting this code, the vehicle may be identified uniquely by the service facility. This information may be used for payment transactions for energy quantities that have been drawn from a charging station, for example.

In a further development of the method, a control signal is transmitted to the vehicle by the service facility to operate an actuator on the motor vehicle. The transmission of various signals by the service facility to the vehicle may serve to trigger actuators arranged in the vehicle, such as actuators that function as an opening mechanism for a door element for example. For example, a signal may be sent to the vehicle by the service facility, the transmitted signal may be captured by a structure-borne sound sensor and forwarded to an evaluation device. In the evaluation device, the signal may be evaluated and the command to operate an actuator may be identified, for example. The command may be forwarded to a control device. A control signal may be sent by the control device to an actuator, for example an opening mechanism for the fuel filler flap, so that it is opened.

In a further development of the method, the actuator is a closure device for a power supply interface, and upon receipt of the control signal the power supply interface is uncovered by the actuator. In order to charge a vehicle automatically at a service facility, particularly a vehicle charging station, the service facility may send an ultrasound signal to the vehicle indicating that the closure flap of the charging interface is to be opened. Upon receipt of the signal sent by the service facility by a structure-borne sound sensor, a control signal may be sent via a control device to the actuator, that is to say for example the closure device for the power supply interface, particularly the charging socket. In this way, the power supply interface is enabled for charging, and may be approached for example by an automatically displaceable charging plug attached to a robot arm for example. In particular, information as to the exact position of the vehicle's charging socket may be transmitted to the service facility via the structure-borne sound sensors on the vehicle. The method may proceed in such manner for example that after the vehicle position has been identified a signal is sent to the vehicle by the service facility requesting information regarding the actions to be performed by the service facility. The signal transmitted by the service facility is captured in the vehicle by the structure-borne sound sensors. A signal with the information regarding the action to be carried out, charging the vehicle, for example is sent from the vehicle to the service facility via the structure-borne sound sensors in response to the information requested by the service facility. Upon receipt of this information, the service facility may request an authentication code for the vehicle in order to initiate the charging operation. This authentication code is transmitted by the vehicle to the service facility via the structure-borne sound sensors. This operation may serve to authorise a payment for example, for the quantity of energy drawn, for example. When the vehicle has been authenticated by the service facility, a signal may be sent to the vehicle by the service facility indicating that the charging operation can be initiated, and for example that information about the precise location of the energy interface, particularly the vehicle's charging socket is required for this purpose. An opening of the cover flap for the vehicle's charging socket may also be requested by the service facility. The service facility may particularly be equipped with a robot arm, on which the charging plug for connecting to the vehicle's energy interface is disposed. Using the information about the exact location of the vehicle's charging socket, the robot arm may then move the charging plug automatically towards the vehicle's energy interface and connect itself thereto. Upon receipt of the signals transmitted by the service facility, a signal may be sent to the service facility from the vehicle containing information about the precise location of the charging socket on the vehicle's outer shell. The opening of the flap covering the charging socket via an actuator may also be initiated. When the charging operation is complete, a signal may be send from the vehicle to the service facility indicating that the required energy quantity has been drawn and that the charging operation can be ended, in particular that the service facility's charging plug can be uncoupled. When uncoupling is complete, a signal may be sent to the vehicle by the service facility indicating that the vehicle has been released to drive away.

The invention further relates to a vehicle, particularly a motor vehicle having at least one structure-borne sound sensor and having at least one evaluation device for evaluating the signals captured by the structure-borne sound sensor, in which it is provided as essential for the purposes of the invention that at least one structure-borne sound sensor is designed to capture an ultrasound signal and at least one structure-borne sound sensor is designed to transmit an ultrasound signal. Structure-borne sound sensors are already disposed on the vehicle's outer shell in many vehicles for detecting contact events. The structure-borne sound sensors may be designed for capturing an ultrasound signal which is transmitted by an external service facility for example to enable communication with the service facility. An ultrasound signal may have the effect of causing a structure-borne sound sensor oscillate so that said signal may be converted into a voltage signal, which may be evaluated. Similarly, ultrasound signals may also be transmitted by the structure-borne sound sensors if a voltage signal is applied to a structure-borne sound sensor, thus causing said sensor to oscillate. In this way, the structure-borne sound sensors may be used both to capture structure-borne sound signal for various functions and to ensure communication between a service facility and the vehicle.

In a further development, the vehicle has at least one actuator, the vehicle has at least one control device for controlling the actuator, and the control device is connected in signal-conducting manner to at least one actuator and at least one evaluation device. Communication signals transmitted by a service facility may be provided to control an actuator on the vehicle. For example, the service facility may be a charging station for electrical charging of a vehicle. The actuator may be an opening mechanism for a door unit, particularly and opening device for a charging flap assigned to a charging interface. A control signal for opening the charge flap on may be sent to the vehicle by the service facility, the control signal may be captured by a structure-borne sound sensor and forwarded to an evaluation device. A corresponding signal is sent to a control device by the evaluation device, which control device sends a control signal to the actuator to open the charging flap.

In a further development, the actuator is a closure device for a power supply interface, particularly for the opening mechanism of a closure flap. A control signal for opening the closure flap over the charging socket may be sent by the charging station to enable automatic charging of a vehicle. The charging socket may be exposed for use by the automatically opening closure flap, so that the charging station can reach the charging socket unassisted, for example via a charging plug mounted on a robot arm.

In the following text, the invention will be explained further with reference to an exemplary embodiment thereof represented in the drawing. In particular:

The sole FIGURE is a schematic diagram illustrating the sequence of the method according to the invention.

The sole FIGURE shows a schematic diagram illustrating a sequence of the method according to the invention. A sound signal is transmitted to a vehicle 1 by a service facility. The transmitted sound signal may be received by a vehicle via structure-borne sound sensors installed in the vehicle 2. The service facility may particularly be a charging station for charging an electric vehicle. An exchange of information between the vehicle and the charging station may be enabled by the transmission and the receipt of sound signals, particularly ultrasound signals. In this context, for example information about the charging state of the vehicle's rechargeable battery may be transferred to the service facility. Upon receipt of the sound signal 2, an authentification signal 3 may be transmitted to the service station by at least one structure-borne sound sensor, so that the vehicle can be identified uniquely by the service station. In order to initiate the charging operation, a control signal may be sent from the service facility to the vehicle. The control signal is received by structure-borne sound sensors in the vehicle 2 and evaluated 5 by an evaluation device. A signal for opening the charging flap may be sent 6 to an actuator, particularly to the closure mechanism of the charging flap which covers the vehicle's charging interface, by a control device. When the charging flap is open, in the case of a fully automated charging station, for example, in which the charging plug is guided by a robot arm for example, the charging operation may be started fully automatically.

All of the features described in the preceding description and in the claims can be combined in any permutation with the features of the independent claims. The disclosure of the invention is thus not limited to the feature combinations that are described and claimed, but rather all feature combinations that are practicable within the scope of the invention are to be considered disclosed.

The invention claimed is:

1. A method for wireless communication between a vehicle, particularly a motor vehicle, and an external service facility, wherein at least one first communication signal is sent to the vehicle by the external service facility,
    wherein the at least one first communication signal is a sound signal and the at least one first communication signal is captured by at least one structure-borne sound sensor installed in the vehicle,
    wherein the at least one structure-borne sound sensor is embodied as a piezoelectrically active element that captures structure-borne sound,
    wherein at least one second communication signal is transmitted to the external service facility via the at least one structure-borne sound sensor, and
    wherein the at least one structure-borne sound sensor is mounted in the vehicle and arranged to detect contacts between an outer shell of the vehicle and external objects by capturing structure-borne sound conducted to the outer shell of the vehicle, and
    wherein a voltage signal is applied to the structure borne sound sensor so that the piezoelectrically active element is caused to oscillate by a piezoelectric effect, thereby being enabled to transmit said at least one second communication signal.

2. The method according to claim 1, wherein the at least one second communication signal is transmitted by the at least one structure-borne sound sensor in the form of an ultrasound signal.

3. The method according to claim 1, wherein the at least one second communication signal is sent to the external service facility by the at least one structure-borne sound sensor as an authentication signal for the unique authentication of the vehicle.

4. The method according to claim 1, wherein a control signal for operating an actuator of the motor vehicle is sent to the motor vehicle from the external service facility.

5. The method according to claim 4, wherein the actuator is a closure device for a power supply interface and that the power supply interface is uncovered by the actuator upon receipt of the control signal.

6. A vehicle, particularly a motor vehicle, having at least one structure-borne sound sensor being embodied as a piezoelectrically active element that captures structure-borne sound and having at least one evaluation device for evaluating signals captured by the at least one structure-borne sound sensor,
    wherein the at least one structure-borne sound sensor is designed to transmit an ultrasound signal from an external service facility,
    wherein the at least one structure-borne sound sensor is designed to transmit an ultrasound signal to said external service facility, and
    wherein the at least one structure-borne sound sensor is mounted in the vehicle and arranged to detect contacts between an outer shell of the vehicle and external objects by capturing structure-borne sound conducted to the outer shell of the vehicle, and
    wherein a voltage signal is applied to the structure borne sound sensor so that the piezoelectrically active element is caused to oscillate by a piezoelectric effect, thereby being enabled to transmit the ultrasound signal to said external service facility.

7. The vehicle according to claim 6, wherein the vehicle has at least one actuator, the vehicle has at least one control device for controlling the actuator, and the control device is connected in signal-conducting manner to at least one actuator and at least one evaluation device.

8. The vehicle according to claim 7, wherein the actuator is a closure device for a power supply interface, particularly an opening mechanism for a closure flap.

* * * * *